(12) United States Patent
Jolivet

(10) Patent No.: US 8,827,164 B2
(45) Date of Patent: Sep. 9, 2014

(54) CONTACTLESS INTERFACE WITHIN A TERMINAL TO SUPPORT A CONTACTLESS SERVICE

(75) Inventor: Paul Jolivet, Paris (FR)

(73) Assignee: LG Electronics Inc., Seoul (KR)

( * ) Notice: Subject to any disclaimer, the term of this patent is extended or adjusted under 35 U.S.C. 154(b) by 253 days.

(21) Appl. No.: 12/521,238

(22) PCT Filed: Dec. 21, 2007

(86) PCT No.: PCT/KR2007/006729
§ 371 (c)(1),
(2), (4) Date: Jun. 25, 2009

(87) PCT Pub. No.: WO2008/091065
PCT Pub. Date: Jul. 31, 2008

(65) Prior Publication Data
US 2010/0019033 A1    Jan. 28, 2010

Related U.S. Application Data

(60) Provisional application No. 60/886,896, filed on Jan. 26, 2007.

(51) Int. Cl.
| | | |
|---|---|---|
| G06K 19/06 | (2006.01) |
| G06Q 20/32 | (2012.01) |
| G06Q 20/20 | (2012.01) |
| G06K 7/00 | (2006.01) |
| G06K 19/077 | (2006.01) |
| H02J 7/02 | (2006.01) |
| H04B 5/02 | (2006.01) |
| H04W 92/08 | (2009.01) |

(52) U.S. Cl.
CPC .............. *G06K 7/0008* (2013.01); *H04W 92/08* (2013.01); *G06Q 20/322* (2013.01); *G06Q 20/327* (2013.01); *G06Q 20/20* (2013.01); *G06Q 20/3227* (2013.01); *G06K 19/07741* (2013.01); *H02J 7/025* (2013.01); *H04B 5/02* (2013.01); *Y02T 90/122* (2013.01)
USPC .......................... 235/492; 235/487; 235/488

(58) Field of Classification Search
USPC ................................. 235/380, 492, 487, 488
See application file for complete search history.

(56) References Cited

U.S. PATENT DOCUMENTS

| 6,127,799 A | 10/2000 | Krishnan |
| 6,184,651 B1 | 2/2001 | Fernandez et al. |

(Continued)

FOREIGN PATENT DOCUMENTS

| GB | 2 422 517 A | 7/2006 |
| JP | 2006-134291 A | 5/2006 |

(Continued)

OTHER PUBLICATIONS

X. Liu, et al. "Finite element simulation of a universal contactless battery charging platform", 2005 IEEE, pp. 1927-1932.

*Primary Examiner* — Michael G Lee
*Assistant Examiner* — Tabitha Chedekel
(74) *Attorney, Agent, or Firm* — Birch, Stewart, Kolasch & Birch, LLP

(57) ABSTRACT

A mobile terminal, including contactless interface defined between a secure element and a contactless function (CLF) module, which allows a contactless service to be performed with an external device. The secure element may be a type of smart card and the external device may be an access gateway for transportation, a point-of-sale (PoS) terminal, or some other application for the user.

6 Claims, 3 Drawing Sheets

(56) References Cited

U.S. PATENT DOCUMENTS

| | | |
|---|---|---|
| 6,294,997 B1 | 9/2001 | Paratore et al. |
| 6,799,721 B2 | 10/2004 | Parrault |
| 7,893,816 B1 | 2/2011 | Kwan |
| 2002/0040936 A1 | 4/2002 | Wentker et al. |
| 2004/0065734 A1 | 4/2004 | Piikivi |
| 2005/0134213 A1 | 6/2005 | Takagi et al. |
| 2005/0216344 A1 | 9/2005 | Collet et al. |
| 2005/0224589 A1 | 10/2005 | Park et al. |
| 2005/0259673 A1 | 11/2005 | Lu et al. |
| 2006/0079284 A1 | 4/2006 | Lu et al. |
| 2006/0111053 A1 | 5/2006 | Wu et al. |
| 2006/0114102 A1 | 6/2006 | Chang et al. |
| 2006/0206710 A1 | 9/2006 | Gehrmann |
| 2007/0005989 A1 | 1/2007 | Conrado et al. |
| 2007/0145135 A1* | 6/2007 | Jogand-Coulomb et al. .. 235/451 |
| 2007/0178938 A1 | 8/2007 | Kravitz et al. |
| 2007/0222602 A1 | 9/2007 | Luo et al. |
| 2007/0293155 A1* | 12/2007 | Liao et al. .................... 455/41.2 |
| 2008/0073426 A1 | 3/2008 | Koh et al. |
| 2008/0116264 A1* | 5/2008 | Hammad et al. .............. 235/382 |
| 2008/0162357 A1 | 7/2008 | Gerardi et al. |
| 2009/0255988 A1 | 10/2009 | Di Luoffo et al. |
| 2010/0227588 A1 | 9/2010 | Bradley |
| 2010/0288839 A1 | 11/2010 | Adams et al. |

FOREIGN PATENT DOCUMENTS

| | | |
|---|---|---|
| KR | 2002-0084043 A | 11/2002 |
| KR | 10-2005-0035788 A | 4/2005 |
| KR | 10-2006-0002325 A | 1/2006 |
| WO | WO 03/084124 A1 | 10/2003 |

* cited by examiner

CONTACTLESS INTERFACE WITHIN A TERMINAL TO SUPPORT A CONTACTLESS SERVICE

This application is the National Phase of PCT/KR2007/006729 filed on Dec. 21, 2007, which claims priority under 35 U.S.C. 119(e) to U.S. Provisional Application No. 60/886,896 filed on Jan. 26, 2007, all of which are hereby expressly incorporated by reference into the present application.

BACKGROUND OF THE INVENTION

1. Field of the Invention
2. Discussion of the Background

The present invention relates to a contactless interface within a terminal to support a contactless service. The related art technologies do not sufficiently address such issues, and thus do not offer appropriate solutions.

The present inventor recognized some drawbacks of the related art. Based upon such recognition, the various features described hereafter have been conceived such that a contactless interface between certain components within a terminal is defined and used in order to support a contactless service.

SUMMARY OF THE INVENTION

Figure 1:
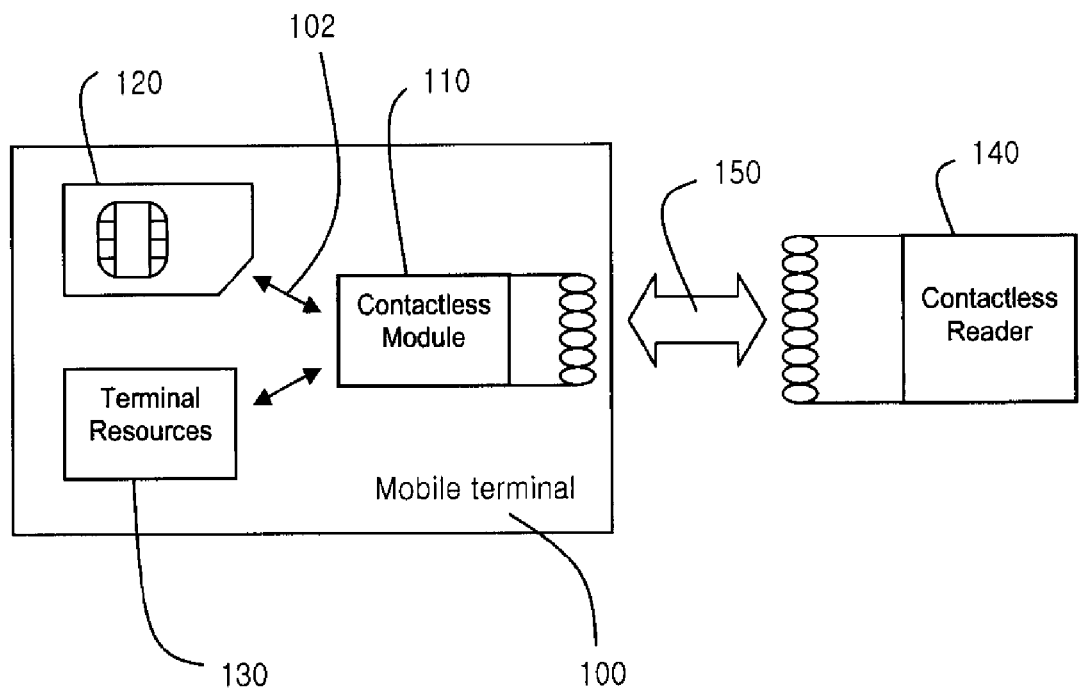
FIG. 1 shows an example of how a mobile terminal and a contactless reader can cooperate with each other.

The inventive concepts and features described herein that are related to a contactless interface will be explained in terms of implementation for a user terminal, such as a mobile phone. However, such details are not meant to limit the various features described herein, which are applicable to other types of devices.

DESCRIPTION OF THE PREFERRED EMBODIMENTS

Hereafter, the term "terminal" will be used to refer to various types of user devices, such as mobile communication terminals, user equipment (UE), mobile equipment (ME), and other devices that support various types of wireless communication technologies.

The definitions of some other terms used herein are provided as follows:

ISO: International Standard Organisation.

ETSI: European Telecommunication Standard Institute (that is in charge of the UICC specification).

MMC: MultiMedia Card as defined by the MMC Association (By extension, the protocol can be defined on the card/reader interface).

UICC: Smart card platform supporting SIM, USIM, and other applications.

USB: Universal Serial Bus as defined by the USB Implementers' Forum (By extension, the protocol can be defined on the card/reader interface).

USIM: UICC application including parameters and tools to identify and authenticate a 3G/UMTS user and to run its applications.

SIM: UICC application including parameters and tools to identify and authenticate a GSM user and to run its applications.

The present invention relates to a contactless (or wireless) interface between a storage medium (such as a UICC or similar smart card) within a terminal and a functional module also within the terminal (such as a contactless function module (CLF) or the like).

It should be noted that mobile terminals under development (or to be developed in the near future) may have multiple card slots to receive more than one smart card. Also, the contactless function module (CLF) itself may removable by being implemented on a smart card or the like.

As the concepts and aspects described herein are applicable to smart cards (or other types of storage media and memories), various standards that are related to and support such smart card technologies (such as ISO/IEC, ETSI, GSM, 3GPP, 3GPP2, OMA, IEEE, etc.) are also part of the exemplary embodiments described herein. It can be understood that the above exemplary standards are not intended to be limiting, as other related standards and technologies would also be applicable to the various features and concepts described herein.

For example, a smart card can be considered to have a basic platform and various applications related thereto. The standardization to support the basic platform is handled by the ETSI, while the various applications are handled by different standard organizations. For example, the USIM and SIM features are handled by the 3GPP, the R.UIM features is handled by the 3GPP2, certain financial applications are handled by EMV (Europay™, MasterCard™, Visa™), and the like.

A smart card (also referred to as a chip card, an integrated circuit card (ICC) or the like) is defined as any pocket-sized card with embedded integrated circuits that can process information. Various ICC applications can be used to receive inputs, perform processing thereon, and deliver outputs. There are two types of ICCs, namely memory cards and microprocessor cards. Memory cards contain non-volatile memory storage components, and some logic circuitry for security. Microprocessor cards contain volatile memory and microprocessor components. Such cards may be made of plastic or some other appropriate material and may have an embedded hologram or other security device to avoid counterfeiting.

Smart cards may be categorized as having a contact interface, a contactless interface, or both. These smart cards typically do not have their own battery or power source.

A contact-type smart card has a small chip (typically made of gold) that makes physical contact with electrical connectors of a smart card reader upon insertion of the smart card, such that information can be read from and written to the chip.

A contactless-type smart card communicates with a card reader through radio frequency identification (RFID) induction technology. Such contactless-type smart cards may also use near field communication (NFC), which is a short-range wireless communication technology that allows data exchanging between devices over a relatively short distance. NFC technology is based on RFID, which makes it compatible with the existing contactless infrastructure already in use for public transportation and payment applications. Also, in a contactless-type smart card, an inductor element can be used to capture and rectify incident RF signals in order to power the integrated circuits in the smart card.

A dual-interface card, namely, a smart card implemented with contactless and contact interfaces, may use shared storage and processing.

The term "contactless" may be used in reference to certain technologies, such as a contactless smart card, a proximity card, contactless payment, radio-frequency identification (RFID), near field communication (NFC), and the like.

The current standard for contactless smart card communications is ISO/IEC 14443 that defines two types of contactless cards (Types A and B) and allows for contactless communications at a distance of up to about 10 centimeters.

To provide enhanced services and applications, more and more terminals will implement to so-called contactless features. Such enhanced services can support transportation applications (e.g., fare payments for riding the subway, metro, buses, etc.), e-purses (e.g., electronic financial transactions, e-banking, etc.), and the like.

The principle of the contactless feature is that a relatively low range medium is used between the terminal and a reader (for instance, a metro/subway turnstile or gate) to execute a fee transaction, to identify the user, or to perform some other type of function or application.

Some aspects regarding contactless features are described in U.S. Patent Application Publication Numbers 2007/0145133 and 2007/0200003, both assigned to the same assignee of the present disclosure, and incorporated herein by reference.

For security and service management reasons, it is likely that the UICC (the telecommunication smart card supporting SIM/USIM) will manage at least part of the contactless services/applications, therefore implementations must consider a physical or logical interface with the UICC.

For technical reasons (such as, electromagnetic constraints (EMC), antenna implementation, etc.), it is impossible (or at least very difficult) to implement all (or the desired or necessary) contactless features in the smart card (UICC). At least part of such features shall be supported in a contactless function module (i.e., a functional entity implemented in hardware, software, or a combination thereof to support contactless services and/or applications), which is part of the terminal.

Until recently, technical proposals were very much oriented on having a dedicated physical (or wired) interface between the UICC and the independent contactless function module of the terminal.

To connect the contactless module to the UICC, an appropriate interface should be designed and employed. In the current state of the discussion, only the addition of a physical interface has been considered.

However, one principle of this invention allows the reuse of one (or more) pre-existing interface means and using particular instructions or commands (such as, by enhancing certain "Toolkit" commands of the UICC). Thus, a channel (or link) is opened between the contactless module and the UICC to perform the desired transactions or other contactless applications.

FIG. 1 shows an example of how a mobile terminal and a contactless reader can cooperate with each other. The mobile terminal 100 has a contactless module 110 that interacts with a smart card 120 and with various terminal resources 130. When the mobile terminal 100 is placed at or near a contactless reader 140, wireless communications can be performed with the contactless module 110 via a wireless (or contactless) interface 150. The contactless module 110 communicates with the smart card 120 via a wireless interface 102.

As an example of a smart card 120, the UICC is a smart card platform that supports various telecommunication applications, such as SIM (for GSM) or USIM (for 3G). The UICC can also support other types of applications. The UICC is the evolution of the GSM SIM card that was only able to run SIM applications.

The UICC continues to evolve with respect to two aspects; 1) employing a large memory and high-speed interface, and 2) supporting contactless services.

A large memory and high-speed interface allow the UICC to support more applications, personal data of the user, certificate procedures, etc. without having trouble in transferring large amounts of data within a reasonable timeframe.

Contactless services address the market of integrating access control services, transportation passes, and the like into the mobile terminal. The UICC would be used in such cases to secure information and applications, whereas for reasons detailed below, most of the actual contactless link management (modulation, power control and management, etc.) would be made in the mobile terminal.

Figure 2:
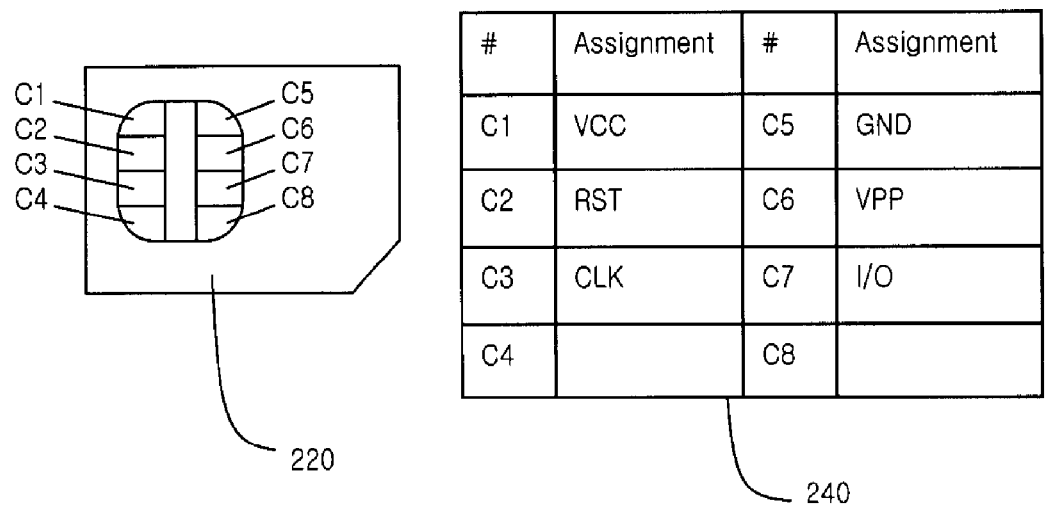
FIG. 2 shows an example of a secure element (smart card, UICC) having a particular allocation for eight (8) physical contacts, as indicated by the chart.

FIG. 2 shows an example of a smart card (UICC) 220 having a particular allocation for eight (8) physical contacts, as indicated by the chart 240.

Although it can be understood that the features of the present invention can also be adapted and implemented to smart cards with a different number of physical contacts, the exemplary embodiments will focus on an 8-contact type UICC.

The physical interface between the UICC and mobile terminal can be based on an 8-contact module. It is currently unlikely that more contacts can be implemented in the future. Therefore, all extensions have to be considered based on the existing contacts, and minimum backward compatibility requirements, such that a session can be always opened on the ISO T=0 protocol, as defined in the ISO 7816 series.

Therefore, only 3 contacts are remaining for further development. Currently, 2 contact candidates are considered for a High-Speed interface between the UICC and the terminal. Additionally, MMC can be implemented by using the C4/C6/C8 contacts, and USB can be implemented by using the C4/C8 contacts.

In order to obtain a physical interface for connection with an external contactless module (such as, via a two-wire based connection), there is a need for either adding new contacts (which is unlikely to be adopted) or to multiplex the signals on the existing contacts that would be used for several logical interfaces (which is heavy or burdensome to support and requires much software and probably hardware). The features of the present invention provide an alternative to the above choices.

There are several types of contactless communications. Currently, there are two categories, each with several modes:

1) Proximity: most of the implementations are based on ISO 14443 specification that includes Types A and B. In some cases, adaptations were made to those standards, for instance Type B' that is used for the transportation system in Paris, France. However, there are also some industry standards, such as MIFARE™ and Felica™.

2) Vicinity: the only proposed specification is ISO 15695, and this system is dedicated to certain types of applications, such as logistics.

The concepts and features described herein are more dedicated to address the operators requirements (i.e., proximity), however the principles described herein not limited to this approach.

For different technical reasons, it is impossible (or at least very difficult) to implement all contactless features in the UICC. Such reasons include the following:

1) Electro-magnetic constraints (EMC): transmitting information in a contactless manner from the UICC with the proper power range to communicate with an external reader (or other device) is likely to interfere with certain hardware functions of the mobile terminal;

2) Antenna integration: in order to get enough signal and power, a significantly large enough antenna has to be implemented, which cannot be integrated for obvious size reasons in a plug-in UICC implementation; and 3) Module integration: the implementation of the entire contactless module means that all contactless types (i.e. several modulation types) need to be supported. Therefore, significant hardware would be required, but because of the little space available for adding more hardware on a UICC (especially those supporting MB of memory), it is unlikely that the entire contactless module can be implemented within the UICC.

Accordingly, the present inventor conceived the possibility of providing a relatively simple contactless link that can operate at very low range (power and distance). Because of its simplicity, such contactless link would bypass the above problems and allow a dedicated link to be established with the contactless function module inside the mobile terminal.

It is likely that both the contactless feature and high-speed protocol will be implemented in the same terminal, because of the operators' request. However, there are limitations in the physical interface that result in difficulties for the coexistence of both features without having much impact on the terminal handset design.

In this context, the present invention disclosure proposes a new contactless interface between the contactless module and the smart card (UICC).

The features described herein are based on the following assumptions:

1) There is a lack of available physical contacts on the smart card (UICC) for implementing the required multiple interfaces.

2) The high-speed interface has to use at least 2 contacts, possibly 3. Therefore, in the best case, only 1 contact is available for supporting contactless features, which is likely not sufficient. Although the techniques related to the so-called Single Wire Protocol (SWP) may have some merit, such are still unlikely to support and fulfill all of the contactless requirements.

3) The contactless module has to support multiple protocols and modulations, but has significant hardware impact (i.e., due to its size) and therefore cannot be included in the UICC. This is also true with respect to the antenna. If an appropriately sized antenna is to be used for an external reader, such will be too large to be integrated in the UICC.

As such, one concept of the present invention is to define a contactless link between a secure element (e.g., a smart card, UICC, etc.) and a functional entity (e.g., contactless module) of the terminal. This link would be relatively simple, which would not suffer from the drawbacks explained above. Such concept allows a physical interface to be completely dedicated to various types of high-speed applications, and even allows implementation of new features that are under development or planned for the near future.

Figure 3:
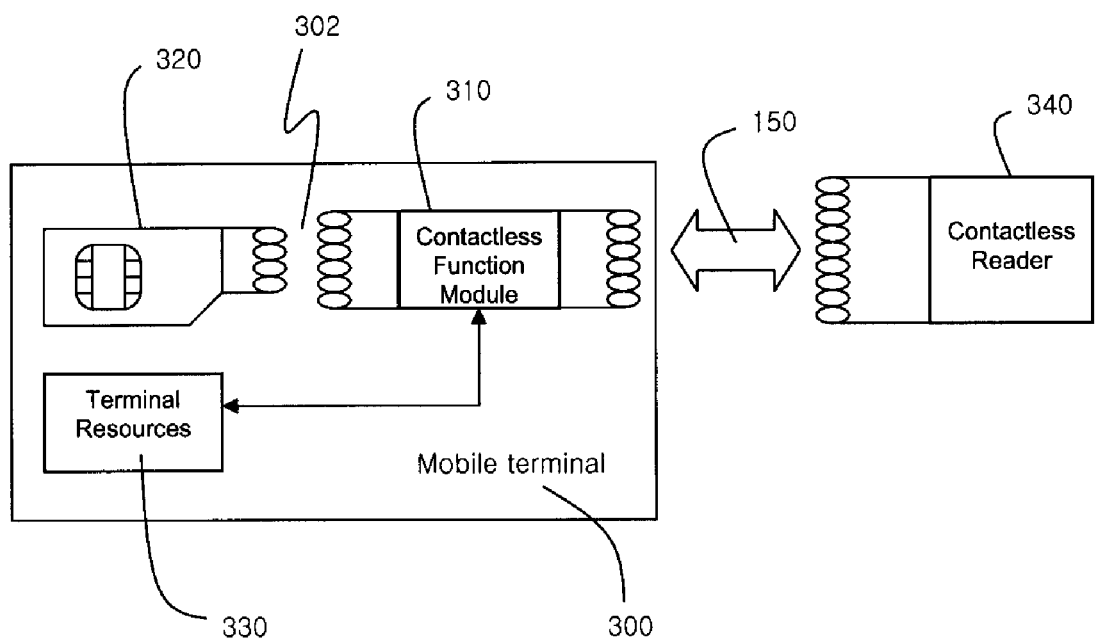
FIG. 3 shows an example of a contactless module with two contactless interfaces for cooperating with a secure element (smart card) and an external contactless reader terminal according to an exemplary embodiment.
Figure 4:
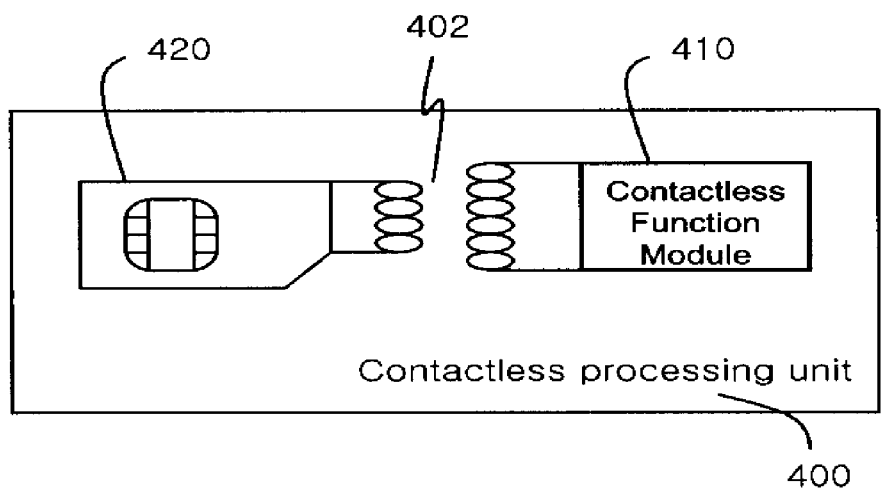
FIG. 4 shows an example of a contactless module with a single contactless interface for cooperating with a secure element (smart card) according to another exemplary embodiment.

FIGS. 3 and 4 show examples of a contactless module and a UICC physical interface according to exemplary embodiments.

The principle of this invention disclosure covers at least the following exemplary use cases:

FIG. 3 shows an exemplary contactless module supporting two contactless interfaces 302 and 150 (i.e., one interfacing with the UICC and another interfacing with the external readers/cards).

FIG. 4 shows an exemplary contactless module supporting one contactless interface that is able to multiplex signals to and from the UICC and the external readers.

The contactless module can also have one or more additional separate interfaces (wired or wireless) with various terminal resources within the terminal, which allow the terminal to also use the contactless bearers for some applications.

The communication protocol used between the secure element (e.g., a smart card, UICC, etc.) and the functional entity (e.g., contactless module, etc.) can easily be based on the ISO 14443 specification (either type A or B), although many other types of communication protocol implementation would be possible.

The advantage of this implementation would be that it is relatively simple. For instance, because the distance between the module and the UICC is very small, there may be no need to implement the communication protocol to support full recovery on errors.

Such advantage is also applicable to power management, as only very low power is required because the distance between the terminal and the reader is small (e.g., about 5 cm). Additionally, antenna size (footprint) can be significantly reduced. The antenna can even be implemented by using techniques known for biometrics passports based on the smart card design. Note that this is true for both card emulation mode and reader mode, i.e. both ways of communication.

The concepts described herein will considerably ease the implementation of features that have many use cases (or practical applications) and will be desired and requested by system (or service) operators and mobile handsets manufacturers.

Case 1: The first use case is for operators (i.e., network operators, service providers, etc.) that would prefer to have both contactless and high speed interface features in the same mobile handset with the lowest impact on the terminal hardware (i.e., at a low cost or price).

Case 2: The end user can easily use both the contactless feature (e.g., a transportation pass) and the high speed interface (e.g., reading MP3 files stored on the UICC) at the same time without having detrimental impacts from one service to the other (such as, an interruption of MP3 reading during transportation pass control because of signal multiplexing on the interface).

The features described herein can simultaneously enable both a High Speed interface and Contactless interface without having to multiplex signals and without re-using ISO or High Speed protocols to support contactless features.

As such, the features herein are related to the following:

1) Solves the issue of concurrent access to the contactless module by both the UICC and the terminal; and 2) Simplifies the terminal internal design: no signal multiplexing nor reallocation of contacts has to be considered.

Other solutions are based on:

1) signal multiplexing which implies a significant complexity and restricts this solution to the only MMC, the USB signal being unlikely to be multiplexed;

2) re-using the high speed interface to communication with an external module for contactless;

3) removing the whole contactless management from the UICC, and relying on the only terminal to implement the whole feature which is unlikely to be the supported approach of the Operators; or 4) adding new physical contacts onto the smart card.

However, these solutions are all more expensive to implement and more burdensome for the terminal to support.

Figure 5:
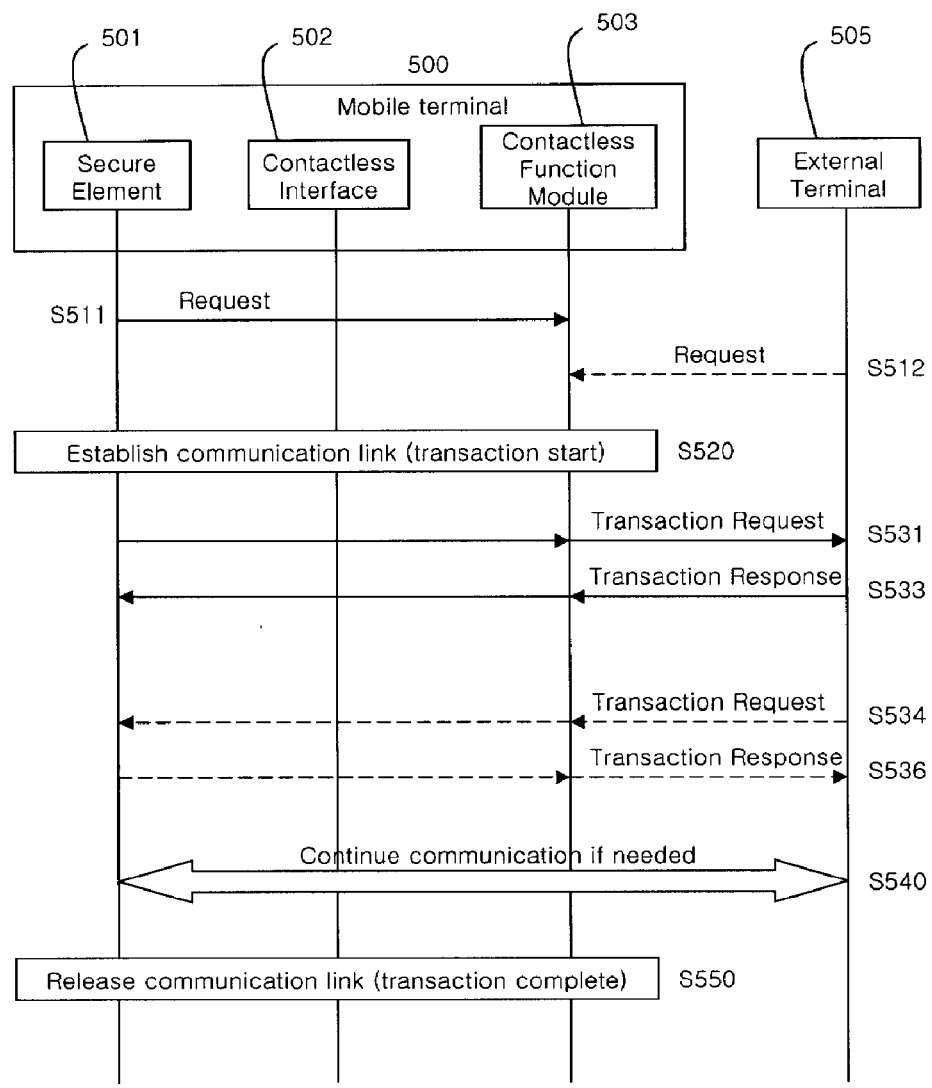
FIG. 5 shows an exemplary signal flow diagram of how the mobile terminal (with components therein) cooperates with an external terminal to process a contactless service, application or function.

FIG. 5 shows an exemplary signal flow diagram of how the mobile terminal (500) with various components therein (501, 502, 503) cooperates with an external terminal (505) to process a contactless service, application or function.

Namely, a method of wireless interfacing between elements within a terminal (500) comprises the steps of detecting a request for processing a contactless a transaction (S511, S512), establishing a link with a secure element via a contactless interface to allow the contactless transaction to start with an external terminal (S520), and releasing the link after the contactless transaction is completed with the external terminal (S550).

The link supports minimum requirements to allow data exchange using contactless protocols supported by a contactless function.

The detecting step (S511, S512) comprises detecting at least one of a power up procedure of the terminal, a wake up procedure of the terminal, a transaction from the secure element, and a transaction from the external terminal. The wake-up procedure of the terminal is compatible with contactless application constraints.

The request is generated within the terminal (S511) or provided from the external terminal (S512), and the secure element is at least one of a removable hardware element, a UICC, a smart card, a SIM card, a USIM card, and a storage medium, and the external terminal is an access gateway or a point-of-sale (PoS) terminal.

After establishing the link with the secure element, one or more transaction requests and transaction responses (S531, S533 and S534, S536 and S540) are exchanged prior to releasing the link.

It should be noted that in FIG. 5, the solid arrows (S511, S531, S533) denote a transaction initiated by the secure element, while the broken arrows (S512, S534, S536) denote a transaction initiated by the external terminal.

Figure 6:
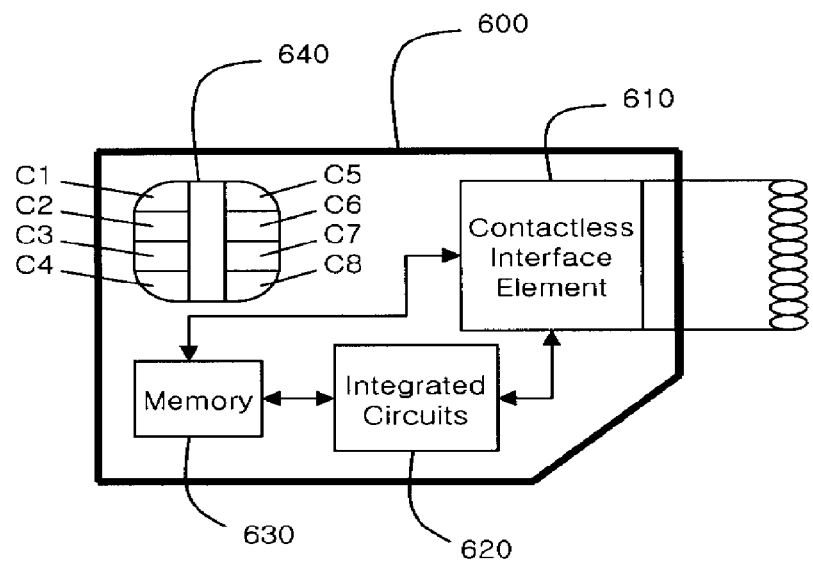
FIG. 6 shows an exemplary structure for a smart card (or similar element) that employs a contactless interface for supporting a contactless service.

FIG. 6 shows an exemplary structure for a smart card (or similar element) that employs a contactless interface for supporting a contactless service.

An exemplary smart card 600 can have a contactless interface element 610 that allows contactless communication between the smart card (i.e., integrated circuits 620 and memory 630) and certain components of a mobile terminal that receives the smart card. Also, a chip 640 with numerous physical contacts may be part of the smart card.

Referring to FIG. 6, a smart card (600) comprises a memory (630) to store information related to supporting contactless applications and a contactless interface element (610) operatively connected with the memory (630) to allow components of a mobile terminal to access the memory (630) and perform a contactless function with an external terminal. The smart card (600) further comprises embedded integrated circuits (620) that cooperate with the memory (630) and the contactless interface element (610) to receive inputs, process information, and deliver outputs to perform the contactless function. The contactless interface element can support near field communication technology.

As described thus far, the concepts and features related to a contactless interface between a smart card and a contactless function module to support various contactless service can also be summed up as follows.

A terminal (100, 300, 500) comprises a secure element (120, 220, 320, 420, 501, 600) that supports a contactless service; a contactless function (CLF) module (110, 310, 410, 503) that communicates with the secure element to enable access to an external device (140, 340, 505); and a wireless interface (102, 302, 402, 502) defined between the secure element and the CLF module to allow the contactless service to be performed with the external device.

The secure element provides secure storage for at least one of applications, parameters, and data related to the contactless service. The secure element supports at least one of transportation access and financial transactions. The secure element comprises at least one of a removable hardware element, a UICC, a smart card, a SIM card, a USIM card, and a storage medium. The secure element comprises embedded software and/or hardware. The secure element has a limited number of physical contacts that are allocated for various functions.

The wireless interface allows transfer of information between the CLF module and the external device. The wireless interface provides a secure and reliable communication link. The wireless interface has relatively minimal interference impact on various components of the terminal. The wireless interface uses a relatively minimal amount of the physical resources that are associated with physical contacts of the secure element.

The external device is at least one of an access gateway and point-of-sale (PoS) terminal.

The CLF module performs formatting and transferring of data with the secure element. The CLF module supports different standards or protocols. The CLF module performs access to the external device via an ISO-based protocol standard. The CLF module has at least one additional interface that allows interfacing with additional resources within the terminal.

The features and concepts herein are applicable to and can be implemented for various types of user devices (e.g., mobile terminals, handsets, wireless communication devices, etc.) and/or entities that can support different types of air interfaces, protocols, and applications used in wireless communications.

The described contactless interface between a smart card and a contactless function module to support various contactless service can be used in a wide variety of fields, such as financial applications (e.g., credit cards, ATM cards, fuel cards, SIM cards for mobile phones, public transportation passes, etc.), identification applications (e.g., personal electronic ID cards, medical ID cards, etc.), security applications (e.g., biometric passports, cryptographic pass cards, employee badges, etc.), and the like.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

The invention claimed is:

1. A method of wireless interfacing between elements within a terminal, the method comprising:
   detecting a request for processing a contactless transaction;
   establishing a link directly between a secure element and a contactless function (CLF) module on the terminal via a contactless interface within the terminal to allow the contactless transaction to start with an external terminal; and
   releasing the link after the contactless transaction is completed with the external terminal, wherein the link supports minimum requirements to allow data exchange using contactless protocols supported by the CLF module, wherein the detecting step includes detecting at least one of a power up procedure of the terminal, a wake up procedure of the terminal, a transaction from the secure element, and a transaction from the external terminal, wherein the wake-up procedure of the terminal is compatible with contactless application constraints, wherein the request is generated within the terminal or provided from the external terminal, wherein the secure element is at least one of a removable hardware element, a UICC, a smart card, a SIM card, a USIM card, and a storage medium, and the external terminal is an access gateway or a point-of-sale (PoS) terminal, and wherein after establishing the link with the secure element, one or more transaction requests and transaction responses are exchanged prior to releasing the link.

2. The method of claim 1, wherein the secure element supports at least one of transportation access and financial transactions.

3. The method of claim 1, wherein the secure element comprises embedded software and/or hardware.

4. The method of claim 1, wherein the contactless interface provides a secure and reliable communication link.

5. The method of claim 1, wherein the contactless interface has relatively minimal interference impact on various components of the terminal.

6. The method of claim 1, wherein the external device is at least one of an access gateway and point-of-sale (PoS) terminal.

* * * * *